No. 793,006. PATENTED JUNE 20, 1905.
H. C. MILLER.
MACHINE FOR LOCATING AND STITCHING BUTTONHOLES IN COLLARS.
APPLICATION FILED APR. 19, 1902.
4 SHEETS—SHEET 2.
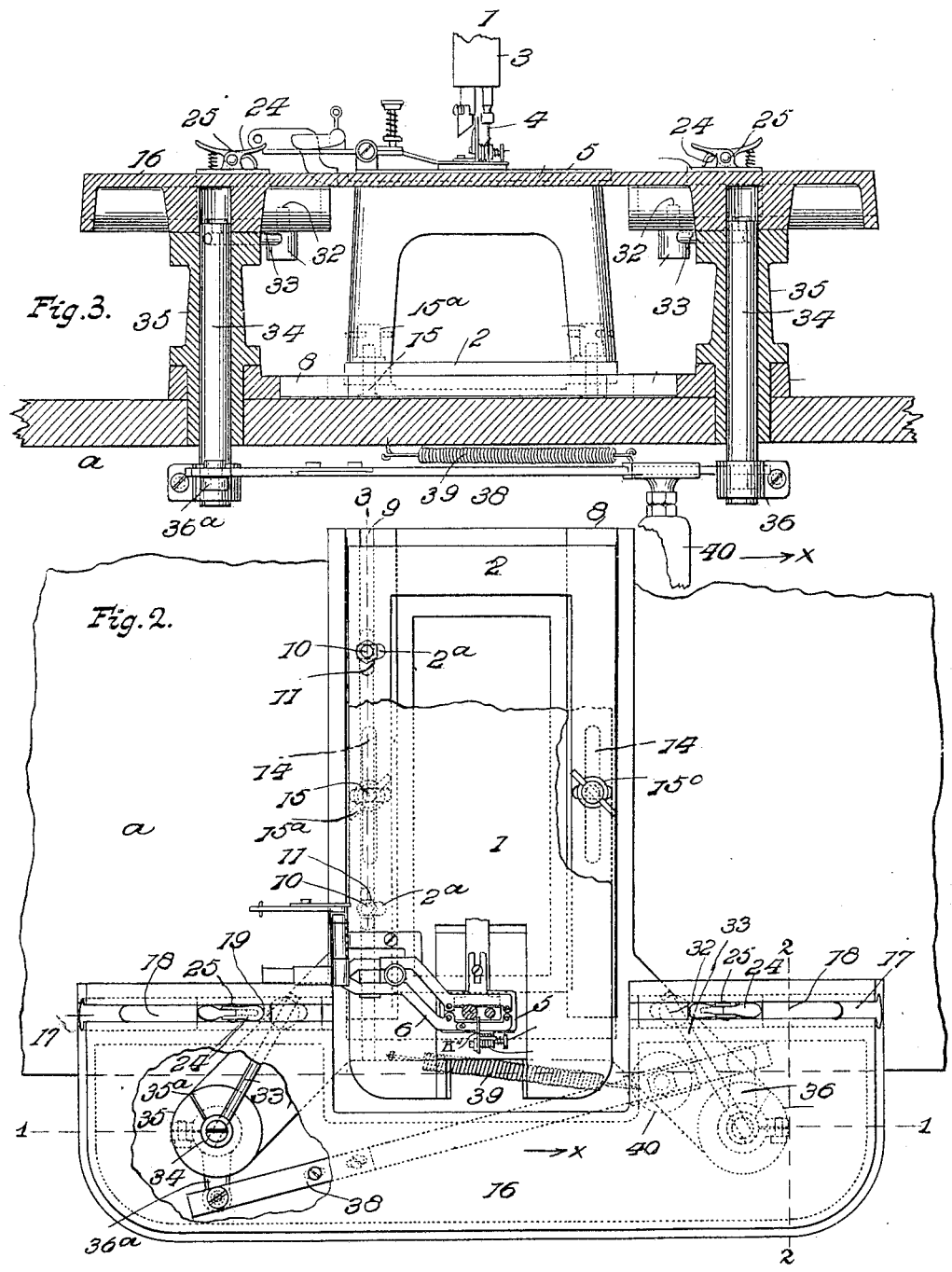
Witnesses,
Henry C. Miller,
Inventor,
by Alex. Selkirk
attorney

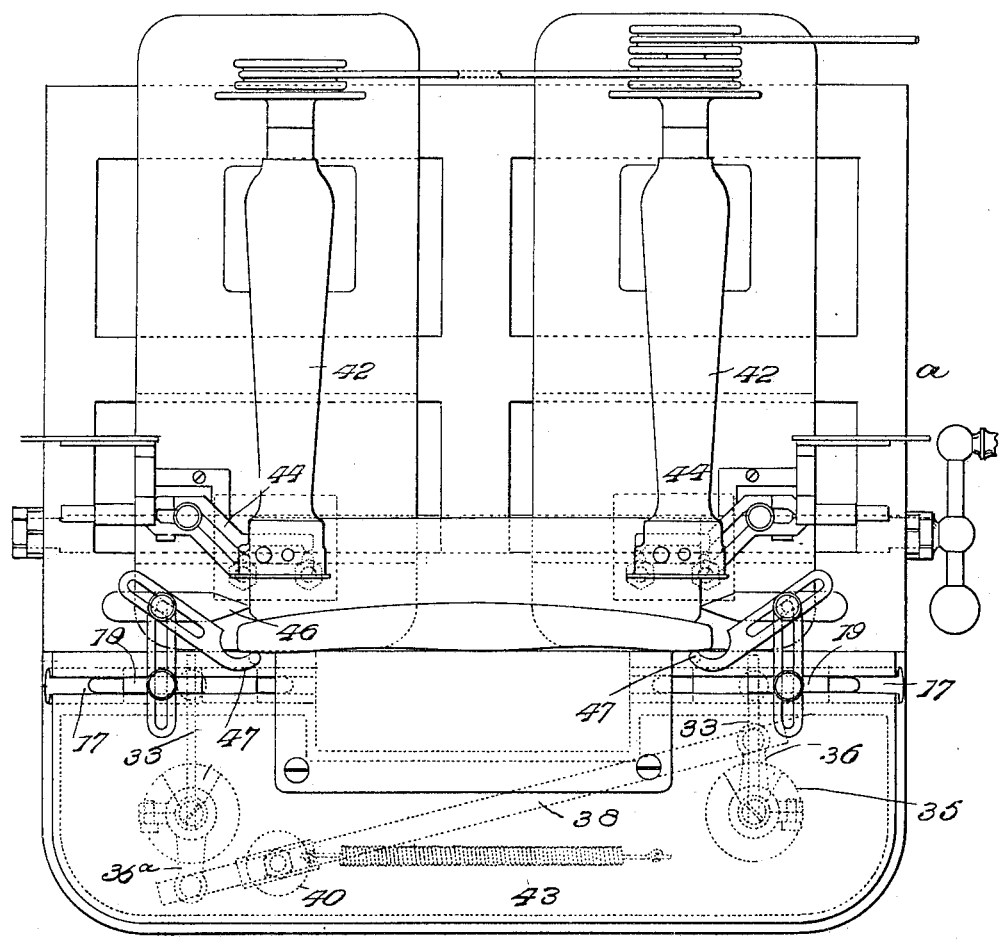

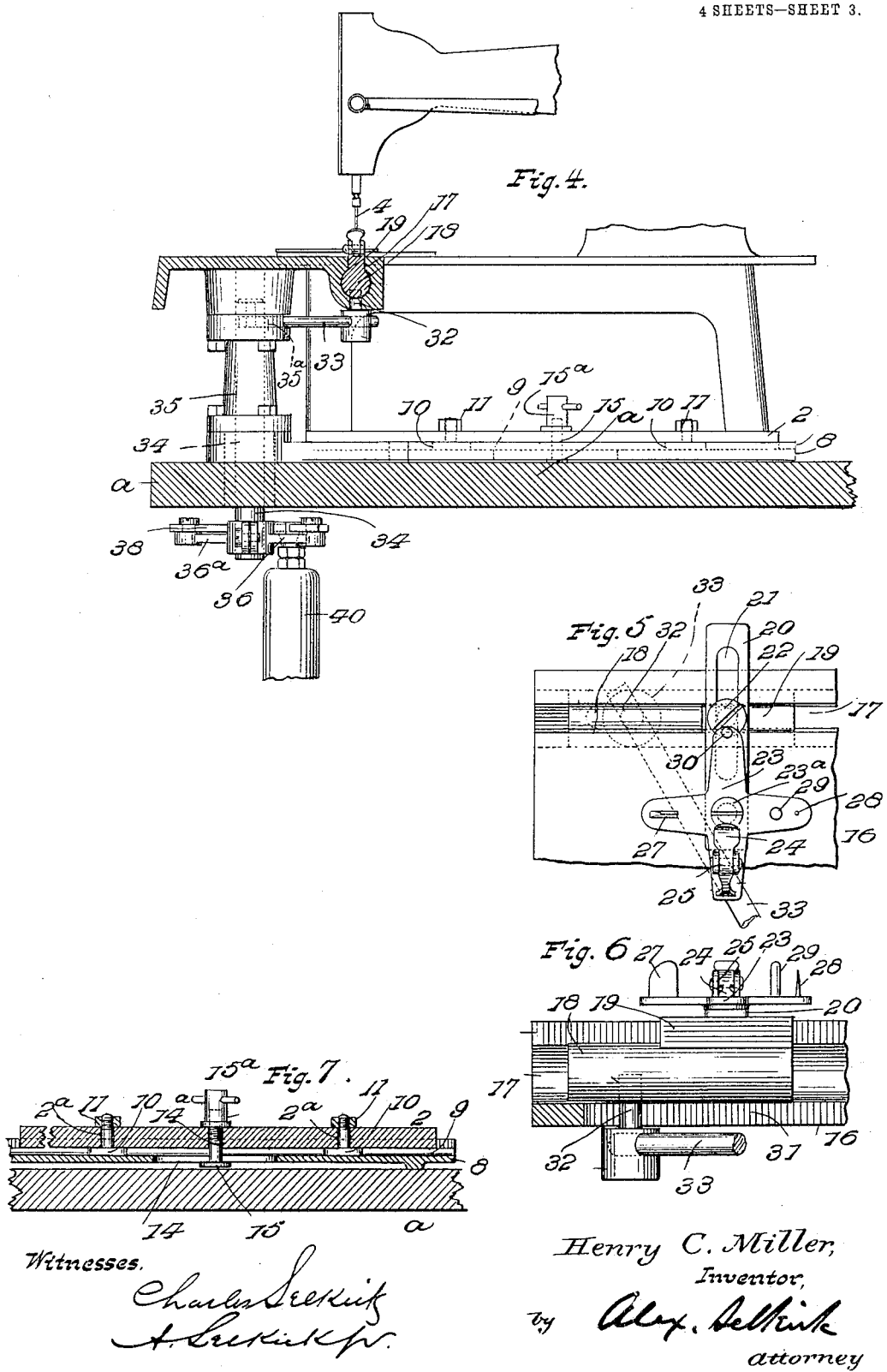

No. 793,006. PATENTED JUNE 20, 1905.
H. C. MILLER.
MACHINE FOR LOCATING AND STITCHING BUTTONHOLES IN COLLARS.
APPLICATION FILED APR. 19, 1902.
4 SHEETS—SHEET 4.
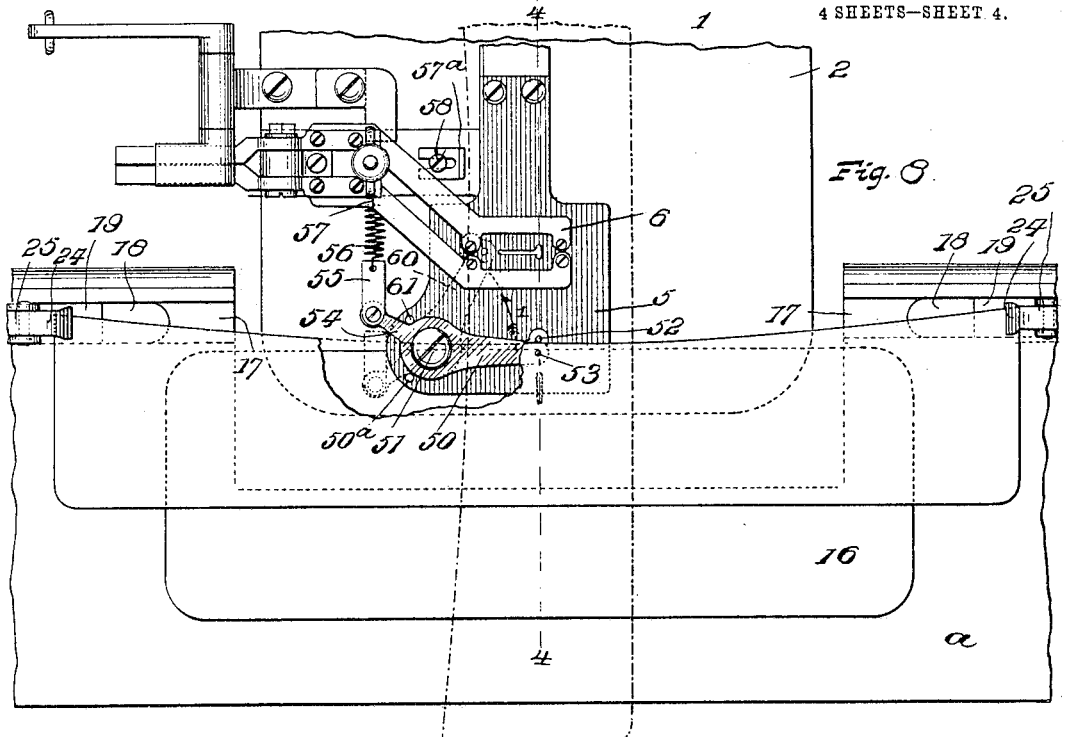
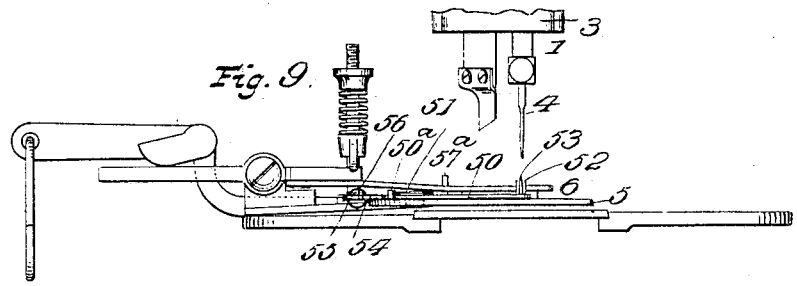
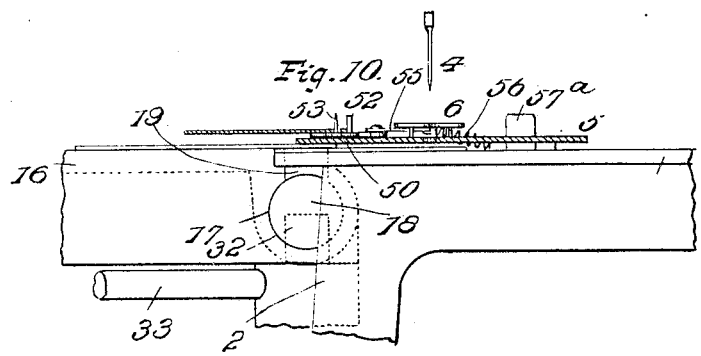
Witnesses.
Henry C. Miller,
Inventor.
by Alex. Selkirk
Attorney No. 793,006. Patented June 20, 1905.

UNITED STATES PATENT OFFICE.

HENRY C. MILLER, OF WATERFORD, NEW YORK.

MACHINE FOR LOCATING AND STITCHING BUTTONHOLES IN COLLARS.

SPECIFICATION forming part of Letters Patent No. 793,006, dated June 20, 1905.

Application filed April 19, 1902. Serial No. 103,741.

*To all whom it may concern:*

Be it known that I, HENRY C. MILLER, a citizen of the United States, and a resident of Waterford, in the county of Saratoga and State of New York, have invented new and useful Improvements in Machines for Locating and Stitching Buttonholes in Collars, Cuffs, &c., of which the following is a specification.

This invention relates to improvements in machines for locating, cutting, and stitching buttonholes in collars, cuffs, &c.

The invention is primarily designed to operate on collars, but is equally applicable to cuffs or other articles where it is essential to accurately locate and form buttonholes at predetermined points.

In the present manufacture of collars an operator makes a mark to indicate the point at which a proposed central buttonhole is to be made, after which the collar is passed to another operator to cut and stitch the buttonhole. This procedure is manifestly slow and expensive. Moreover, it is absolutely impossible to locate the buttonhole exactly in the center between the end buttonholes. It is the latter difficulty I successfully overcome. The mechanisms for accomplishing such result will be hereinafter described. Manufacturers and users of collars have long appreciated the defect in the means employed for centrally locating a buttonhole in a collar, and various attempts have been made to cure such defect. Many collars are thrown away because of the misplaced buttonholes and a large number of them have to be replaced.

According to my invention I propose to arrange appropriate mechanism whereby a collar can be properly positioned to accurately locate it to receive a center buttonhole.

The invention also comprehends improvements in the details of construction for carrying out the objects of my invention, the principal features of which will be hereinafter referred to, and particularly pointed out in the claims.

In the drawings, Figure 1 is a plan view of a machine constructed in accordance with my invention, but showing it as arranged for cutting and sewing buttonholes in cuffs. Fig. 2 is a plan view of the machine when used for operating on collars, parts of the sewing-machine being broken away to more clearly illustrate the invention. Fig. 3 is a vertical section on the line 1 1, Fig. 2. Fig. 4 is a transverse section on the line 2 2, Fig. 2. Fig. 5 is a detail plan view of the movable gaging and clamping devices. Fig. 6 is a section of the same, parts being in elevation. Fig. 7 is a detail section on the line 3 3, Fig. 2. Fig. 8 is a plan view of my improved machine arranged to stitch a central buttonhole transverse of the length of a collar. Fig. 9 is a detail front elevation of the same. Fig. 10 is a transverse section on the line 4 4, Fig. 8.

The numeral 1 indicates a buttonhole cutting and stitching machine of any approved type, which comprises, essentially, a base 2, head 3, reciprocating needle 4, lower cloth-clamp plate 5, and upper clamp-plate 6. These parts are common to all buttonhole-stitching machines and specifically form no part of this invention.

The base 2 is mounted to slide on a frame 8, having a slot 9. In the slot 9 fits the elongated heads of two bolts 10, which pass through slots 2ª in the base 2 and are provided with nuts 11. The purpose of this adjustment is to set the cutting-blade of the buttonhole-machine in exact center alinement between end gages hereinafter referred to. This adjustment once made is not supposed to be altered under any consideration, as it is of the utmost importance that the blade of the buttonhole-machine be always in the exact center between the end gages at the time of cut of the buttonhole. I, however, provide a second adjustment for the moving of the buttonhole-machine to or from the operator to locate the buttonhole. This adjustment consists in forming slots 14 in the frame, and through these slots and openings 14ª in the base 2 pass bolts 15, having clamping-nuts 15ª. The buttonhole-machine having been set to have its blade exactly in the center between the two end gages, or, if desired, the end gages may be adjusted relative to the buttonhole-machine, the bolts 15 are released to move the buttonhole-machine to or from the operator to bring the knife at a predetermined point at the time of cut in the width of the collar, after which the nuts 15ª are tightened and the machine is in readiness for operation; but if a different style of collar is to receive a buttonhole in its center it is only necessary to move the buttonhole-machine to or from the operator, which, as before stated, is accomplished through the medium of the bolts 15 and coacting slots. Therefore the buttonhole-machine having been adjusted by the bolts 10, and as this adjustment once made is never changed, it is only necessary to adjust the machine to or from the operator to locate the cutting-blade to cut a buttonhole in any style or shape of collar.

A table 16 is mounted in front of the sewing-machine and on a plane with the cloth-clamping members. In opposite ends of the table are formed guideways 17, which receive what I shall term "movable" gaging devices. Both these devices being exactly alike, I will describe but one.

Referring particularly to Figs. 5 and 6, 18 indicates a slide having a square boss 19, on which is mounted an adjustable arm 20, having a slot 21, secured to the boss by a screw 22. On the outer end of the arm is a plate 23, carrying a series of gages to accommodate different styles of collars and cuffs. 24 indicates a hinged spring-clamp mounted in lugs 25, projecting from the plate 23. This form of gage is not limited to a plate, but may be applied directly to the boss 19, as shown in Figs. 2 and 3. The end of the collar is adapted to be clamped between the hinged clamp and plate while it is being centralized. If a collar is to be operated upon which has previously had the end buttonhole formed, then the blade indicated at 27 would be employed. The blade is designed to engage the end buttonhole and hold it until released by the operator, as will be clearly apparent. If the operator desires to operate on a collar without an end buttonhole, the plate 23 is turned to position the pin 28 and gage-pin 29, so that the end of the collar can be placed against the said gage-pin and the collar forced down on the pin 28. Another pin 30 projects from the plate 19 and is designed to act as a gage against which the end of the article to be operated upon will abut. Obviously the plate 19 being pivotally mounted, it can be quickly turned upon release of the screw 23ª, so as to bring either of the various gages into proper location to coact with a collar.

While it is essential to provide a positive gage in a machine constructed in accordance with this invention, and I have so described several forms of such gages, nevertheless I do not desire to limit myself to any particular form of gage, inasmuch as various other specific devices may be used without departing from the spirit and scope of my invention.

Fitting in an opening in the under side of the slide 18 and extending through a slot 31 in the bottom of the guideway is a pin 32, projecting from a head on the end of an arm 33. The arm 33 is fast on a rod 34, mounted in vertical bearings 35, on which the table 16 is supported, said arm working in a horizontal slot 35ª in the upper end of the bearing. At the lower end of the rod 34 and below the operator's table $a$, which supports the mechanism, is an arm 36. In this particular the two gaging mechanisms differ in that the arm 36 of one gage projects from while the corresponding arm 36ª of the other gage projects toward the operator. An adjustable bar 38 is pivotally connected to the free ends of the arms 36 36ª, as clearly shown in Fig. 2, so that motion communicated to either will be reflected to the other. A spring 39 is connected at one end to the bar 38 and at its opposite end to the operator's table $a$, and a handle 40 depends from the rod for operating the gages.

The operation of the invention, as illustrated in Figs. 2 and 3, is substantially as follows: Assuming the machine 1 having been adjusted properly and the nuts and bolts 10 and 15 tightened and the gages are in their normal position, the operator depresses the ends of the spring-clamps 24 and inserts the ends of the collar until their ends abut against the lugs, and then pressure on the clamp is released and the collar is securely fastened. It is to be understood, however, that the normal distance between the gages is considerably less than the length of the proposed collar to be operated upon. The cloth-clamp 6 is elevated, and the ends of the collar having been fastened to the gages the operator with her knee pushes against the handle 40 and moves the bar in the direction of the arrow $x$, and this movement, through the connections described, moves said gages simultaneously the same distance in opposite directions from a center. This levels the collar, and as the stitching mechanism has previously been located centrally between the gages obviously the longitudinal center of the collar will be in exact alinement with the stitching mechanism. The collar having been accurately positioned, the operator next releases pressure on the upper cloth-clamp 6, and the collar is firmly clamped thereby in position to receive the buttonhole, the stitching mechanism is started, and the center buttonhole is cut and stitched in the usual manner. While this operation is in progress, the operator releases pressure on the handle 40, and the spring 39 returns the gages to their normal position, and another collar is inserted ready to be gaged before the operation on the first collar is finished.

It is highly important in an organized machine of this character that the center of the buttonhole-cutting blade at the time of cut be exactly midway between the two gages to insure the proposed buttonhole being located exactly in the center of the collar.

Of course the plates 23 can be turned to present corresponding gages to coöperate with collars of special styles, the gage best suited for the peculiar shape of collar being the one used.

After a collar is firmly held by the cloth-clamping device and the stitching-machine is started and the outward pull of the gaging devices is released it will be seen that it makes no difference what type of buttonhole-machine is used. This is wherein my improvement is operable with any well-known buttonhole-stitching machine.

The two gaging devices being positively connected, one cannot move more than the other. Consequently when the operator throws the handle the two ends of the collar are moved exactly the same distance in opposite directions, which insures the center of the collar being properly positioned to receive the buttonhole.

My invention is capable of gaging cuffs or the like articles to form and stitch end buttonholes. This application of the improvement is shown in Fig. 1, wherein 42 42 indicate buttonhole cutting and stitching machines spaced from each other and adapted to form buttonholes at the ends of a cuff. However, in this instance the gages do not positively engage the cuff, but are separated sufficiently to allow the operator to position the cuff, and thereby by gradually releasing the pressure the spring 43 draws the two gages toward each other until the operator by moving the cuff accurately locates it, whereupon the cloth-clamping devices 44 are released and firmly hold the collar. Then the stitching-machines are started. While this operation is going on another cuff is being gaged to be ready to slip under the clamps when the buttonholes are completed.

By reference to Fig. 1 it will be seen that the gage is slightly different from either of the forms described; but inasmuch as a cuff must be gaged from the ends and edges I find better results by providing adjustable endwise stop-gages 46 and edge gages 47 coöperating therewith.

There are certain styles and makes of collars wherein the central buttonhole is transverse of the length of the collar, and to meet this requirement I have provided means whereby it may be accomplished.

Referring to Figs. 8, 9, and 10, the numeral 50 indicates a lever limited by a stop-pin 50ᵃ and pivoted at 51 to the lower cloth-clamp, and to the free end of this lever is fixed a stud or gage 52, adjacent which is a pin 53. Extending from the opposite end of the lever is a short arm 54, connected by a link 55 with a spring 56, the opposite end being secured at 57. At a suitable location adjacent the cloth-clamps is adjustably mounted a transversely-arranged gage 57ᵃ, adapted to be adjusted by a set-screw 58. To cut and stitch a center buttonhole transverse of the length of a collar, the stitching-machine is moved a sufficient distance to bring the stud 52 in line with the bottom edge of a collar stretched and flattened by the end gages 16, as before described and as clearly shown in Fig. 8. The stitching-machine having been adjusted, a collar is inserted between the gage-clamps 16, and they are spread apart, the edge of the collar being against the stud 52, when by a slight pressure on the collar the pin 53 is forced through it, after which the end gages are released. The collar is held at its center by the pin 53 and against the stud 52, and the operator throws the lever 50 in the position shown by the dotted line 60, the movement being limited by a stop 61. The bottom edge of the collar strikes against the gage 57ᵃ and positions it relative to the stitching mechanism, at which time the cloth-clamps firmly hold it. The parts are so related and arranged that when the lever 50 and the collar supported thereby is thrown around the center of the collar will be exactly in alinement with the center of the cutting-blade and sliding mechanisms. Immediately the collar is properly located the cloth-clamps firmly take hold of it, and as the length of the collar is parallel with the machine a transverse buttonhole will be made.

From the foregoing description it will be evident that I have provided a machine which will accurately locate a collar or cuff to receive buttonholes at predetermined points and one capable of being operated conveniently and quickly. An operator soon becomes so accustomed to manipulating the mechanisms that the amount of work turned out is many times more than can be accomplished with the means now employed for this purpose.

My invention is extremely simple and is susceptible to many minor changes without departing from the spirit and scope of the improvement, and I desire to have it understood that it is not limited to operate upon collars and cuffs, as it works well with any class of goods wherein buttonholes are to be accurately worked at predetermined points. To this end I desire to have it understood that when I mention collars in the claims I mean it to include all articles in which buttonholes are to be made.

What I claim as new is—

1. In combination, mechanism for making a buttonhole, two end gages having means for holding an article to be operated upon and adapted to be moved to and from each other, means connecting the end gages, and means for moving said gages in opposite directions preceding each operation of the buttonhole-making mechanism, for presenting the article to said buttonhole-making mechanism.

2. In combination, mechanism for making a buttonhole, two end gages having means for holding an article to be operated upon, each gage and holding means adapted to be simultaneously moved an equidistance from the buttonhole-making mechanism, means for simultaneously moving the gages an equidistance in opposite directions from the buttonhole-making mechanism preceding each operation of said buttonhole-making mechanism for presenting the article thereto.

3. In combination, two end gaging devices having means to engage a collar, a buttonhole-machine, comprising essentially a cutting-blade and stitching mechanism located midway between the gaging devices, mechanism connecting the gaging devices for moving them an equidistance in opposite directions, the gages being moved toward each other to engage the collar and away from each other to flatten and gage the collar, means for operating the gages, and means operating the buttonhole-machine.

4. In combination, a buttonhole-stitching machine, means for adjusting the machine to or from the operator, guideways, slides in said ways, a gage carried by each slide, and mechanism connecting the slides for moving the gages an equidistance to or from the buttonhole-stitching machine.

5. In combination, a buttonhole-stitching machine, movable gaging devices mounted to pull the ends of a collar or the like in opposite directions to level it, to relatively locate a predetermined point in the collar for the cutting and stitching machine to operate upon, and means for operating the gages to or from each other.

6. In combination, a mechanism for cutting and stitching a buttonhole, mechanism for gripping an article in which a buttonhole is to be worked, and mechanism connected to the gripping mechanism for operating the latter for leveling and positioning an article for locating a predetermined point thereof relative to the cutting and stitching mechanism.

7. In combination, a buttonhole cutting and stitching machine having a table, a work-supporting table, means for adjusting the stitching-machine to or from the work-supporting table, means for adjusting the sewing-machine table in either direction parallel with the work-supporting table and movable means each side the sewing-machine for pulling each end of an article to receive a buttonhole an equidistance from the stitching-machine, and means operating the stitching-machine to form a buttonhole in the article.

8. In combination, a work-supporting table, a buttonhole cutting and stitching machine adjustably mounted in rear of said table, a work-centralizing mechanism comprising two gaging devices, mechanism for operating the gaging devices, said mechanism being operated by pressure to space the gaging devices, and means connected to the gage-operating mechanism for automatically returning the gages to normal position.

9. In combination, a work-supporting table, a buttonhole-stitching machine adjustably supported in rear of the table, a work-centralizing mechanism comprising two similar gaging devices, means for moving said gaging devices simultaneously in opposite directions, and means to move them automatically in a reverse direction.

10. In combination, a work-supporting table, a buttonhole-stitching machine adjustably supported in rear of the table, two movable work-gaging devices for positioning a collar to be operated upon by the buttonhole-stitching machine, means for moving said devices in opposite directions with relation to the stitching-machine, said means being operated and maintained in one position by pressure exerted by the operator, and a spring for returning the gages to normal position on the release of said pressure.

11. In combination, a work-supporting table, a buttonhole-stitching machine supported in rear of and adjustable in relation to said work-supporting table, reciprocating members mounted in the table on each side the stitching-machine, a gaging device supported by each reciprocating member, a bar connected with and adapted to simultaneously move the reciprocating members in opposite directions, a post depending from said bar and movable through pressure by the operator to operate the gaging devices simultaneously, and a means for automatically returning said gaging devices to normal position on release of said pressure.

12. In combination, a buttonhole-stitching mechanism, a work-centralizing mechanism comprising gaging devices, mechanism operable to operate the gaging devices for positioning a collar to be operated upon by the buttonhole-stitching mechanism an equidistance from the buttonhole-stitching mechanism and maintain them in position by pressure exerted by the operator, and means for returning the gages to normal position.

13. In combination, an adjustable stitching mechanism, work-centralizing mechanism comprising suitable gaging devices, means for moving said gaging devices simultaneously in opposite directions, and means to move them automatically in a reverse direction.

14. In combination, a buttonhole-stitching machine, work-centralizing mechanism comprising duplicate gaging devices, means operable by pressure to operate said gaging devices in opposite directions, and means for returning the gages to normal position on release of said pressure.

15. In combination, a buttonhole-stitching mechanism, gaging devices, means to operate said gaging devices, said means being operable by pressure exerted by the operator, and means connected to the gage-operating means for automatically returning said gaging device to normal position on release of said pressure.

16. In combination, a buttonhole-machine having a blade and a stitching mechanism, two movable gages located to engage the ends of a collar, means moving the gages equidistance in opposite directions to level and gage a collar, the blade of the buttonhole-stitching machine being located in exact center between the two gaging devices at the time of cut, and means for operating the buttonhole-machine to stitch and cut a buttonhole in the collar after the latter has been flattened and gaged.

17. In combination, a buttonhole-stitching machine, two end gages mounted to be moved equidistance in opposite directions, shafts connected to the gaging devices, arms connected to the shaft, an adjustable rod connecting the arms, and means for automatically returning the arms to a normal position after the collar has been gaged.

18. In combination, a buttonhole cutting and stitching mechanism, a centralizing device comprising two end gages which positively engage a collar, and mechanism for moving the two gages simultaneously in opposite directions an equidistance to level and gage a collar to receive a central buttonhole, and means for operating the buttonhole-machine.

19. In combination, a buttonhole-machine comprising stitching mechanism and a cutting-blade, end gages, means operating the gages in opposite directions to level a collar to receive a buttonhole, and means for adjusting the buttonhole-machine to locate its cutting-blade so that said blade will be in exact center between the gages at the time the buttonhole is cut.

20. In combination, a buttonhole-machine comprising stitching mechanism and a cutting-blade, end gages, means operating the gages, means for pulling the ends of a collar an equidistance in opposite directions to position said collar to receive a buttonhole, and means for adjusting the buttonhole-machine to locate its cutting-blade so that said blade will be in exact center between the gages at the time the buttonhole is cut.

21. In buttonhole-making mechanism, the combination with the devices which make the buttonhole, of two slidably-mounted gages, mechanism for moving the gages in opposite directions for adjusting the article operated upon relatively to the buttonhole-making devices, means for holding the collar after it has been adjusted, and means for operating the buttonhole mechanisms.

22. In combination, a buttonhole-machine, two slidably-mounted gages, mechanism for operating the gages toward or from each other, said mechanism comprising pivots, arms connecting the pivots and gages, other arms connected to the pivots, a bar connecting the second-mentioned arms, an operating device to spread the gages, and means to return the gages to normal position.

23. In combination, an adjustably-mounted buttonhole-machine, slidably-mounted gages, mechanism operating the gages in opposite directions to level and gage a collar, means holding the collar after it has been gaged, and means for operating the holding means independent of the gaging devices.

24. In combination, a buttonhole-machine, slidably-mounted gages, mechanism for moving the gages an equidistance in opposite directions to level a collar, and means for adjusting the relative location of each gage.

25. In combination, a buttonhole-machine, slidably-mounted gages, mechanism for moving the gages an equidistance in opposite directions to level a collar, means holding the collar after it is leveled, and means for adjusting the relative location of each gage.

26. In combination, a buttonhole-machine, means for adjusting the buttonhole-machine, slidably-mounted gages, mechanisms for moving the gages an equidistance in opposite directions to level a collar, means for adjusting the relative location of each gage, and means for holding the collar after it is leveled.

27. In combination, a buttonhole-machine, slidably-mounted gages, mechanism for manually moving the gages in opposite directions to level a collar, means for holding the collar after it has been leveled, and means for returning the gages to normal position independent of the holding means.

28. In buttonhole-making mechanism, the combination with the devices which make the buttonhole, of gages for adjusting the material operated upon relatively to the buttonhole-making devices, and means connecting the gages for varying the distance between the same preceding each operation of the buttonhole-making devices for adjusting the material.

29. In buttonhole-making mechanism, the combination with the devices which make the buttonhole, of gages for adjusting the material operated upon relatively to the buttonhole-making devices, and means for varying the distance between the gages preceding each operation of the buttonhole-making devices for adjusting the material.

30. In buttonhole-making mechanism, the combination with the devices which make the buttonhole, of gages carrying holding devices for adjusting the material operated upon relatively to the buttonhole-making devices, and means for varying the distance between the gages, substantially as described.

31. In buttonhole-making mechanism, the combination with the devices which make the buttonholes, of gages carrying holding devices for adjusting the material operated upon relatively to the buttonhole-making devices, means connecting the gages, and means for varying the distance between the gages preceding each operation of the buttonhole-making devices.

HENRY C. MILLER.

Witnesses:
CHARLES SELKIRK,
A. SELKIRK, Jr.